US007871670B2

(12) United States Patent
Nguyen et al.

(10) Patent No.: US 7,871,670 B2
(45) Date of Patent: *Jan. 18, 2011

(54) MICROFABRICATION USING REPLICATED PATTERNED TOPOGRAPHY AND SELF-ASSEMBLED MONOLAYERS

(75) Inventors: Khanh P. Nguyen, St. Paul, MN (US); Matthew H. Frey, Cottage Grove, MN (US); Haiyan Zhang, Woodbury, MN (US); Jun-Ying Zhang, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 667 days.

This patent is subject to a terminal disclaimer.

(21) Appl. No.: 11/200,551

(22) Filed: Aug. 10, 2005

(65) Prior Publication Data

US 2007/0036951 A1    Feb. 15, 2007

(51) Int. Cl.
| | |
|---|---|
| *B05D 1/36* | (2006.01) |
| *B05D 3/00* | (2006.01) |
| *B05D 3/10* | (2006.01) |
| *C23C 18/18* | (2006.01) |
| *C23C 18/31* | (2006.01) |
| *C23C 18/34* | (2006.01) |
| *C23C 18/40* | (2006.01) |
| *C23C 18/44* | (2006.01) |
| *C23C 18/48* | (2006.01) |
| *C23C 18/50* | (2006.01) |

(52) U.S. Cl. .................. 427/264; 427/261; 427/304; 427/305; 427/306

(58) Field of Classification Search .................. 427/306
See application file for complete search history.

(56) References Cited

U.S. PATENT DOCUMENTS 2,963,748 A    12/1960    Young (Continued)

FOREIGN PATENT DOCUMENTS

EP        837 623 A1    *    4/1998

(Continued)

OTHER PUBLICATIONS

Dressick, et al "Covalent Binding of Pd Catalysts to Ligating Self-Assembled Monolayer Films for Selective Electroless Metal Deposition", J. Electrochem. Soc., vol. 141, No. 1, Jan. 1994, pp. 210-220.*

(Continued)

*Primary Examiner*—Katherine A Bareford
(74) *Attorney, Agent, or Firm*—Stephen L. Crooks (57) ABSTRACT

A method of selectively and electrolessly depositing a metal onto a substrate having a metallic patterned-nanostructure surface is disclosed. The method includes providing a tool having a patterned-nanostructure surface, the patterned-nanostructure surface having surface regions having a nanostructured surface, replicating the tool patterned-nanostructure surface onto a substrate to form a substrate patterned-nanostructure surface, disposing a metal layer on the substrate patterned-nanostructure surface to form a metallic patterned-nanostructure surface region, forming a self-assembled monolayer on the metallic patterned-nanostructure surface region, exposing the self-assembled monolayer to an electroless plating solution comprising a deposit metal, and depositing electrolessly the deposit metal selectively on the surface regions having a metallic nanostructured surface. Articles formed from this method are also disclosed.

14 Claims, 4 Drawing Sheets

U.S. PATENT DOCUMENTS

| | | | |
|---|---|---|---|
| 3,075,280 A | | 1/1963 | Jack et al. |
| 3,672,986 A | * | 6/1972 | Schneble, Jr. et al. ........ 428/139 |
| 3,800,020 A | | 3/1974 | Parfet |
| 3,891,514 A | | 6/1975 | Klemm |
| 3,938,831 A | * | 2/1976 | Herman ........................ 281/29 |
| 3,952,152 A | | 4/1976 | Lill et al. |
| 4,179,797 A | | 12/1979 | Johnson |
| 4,321,296 A | | 3/1982 | Rougler |
| 4,381,421 A | | 4/1983 | Coats et al. |
| 4,412,255 A | | 10/1983 | Kuhlman et al. |
| 4,510,347 A | | 4/1985 | Wiech, Jr. |
| 4,576,850 A | | 3/1986 | Martens |
| 4,614,837 A | | 9/1986 | Kane et al. |
| 4,728,591 A | | 3/1988 | Clark et al. |
| 5,061,438 A | | 10/1991 | Lillie et al. |
| 5,094,811 A | | 3/1992 | Kane et al. |
| 5,399,879 A | | 3/1995 | Liu |
| 5,462,624 A | | 10/1995 | Kwon |
| 5,512,131 A | | 4/1996 | Kumar et al. |
| 5,595,943 A | | 1/1997 | Itabashi et al. |
| 5,932,150 A | | 8/1999 | Lacey |
| 6,096,247 A | | 8/2000 | Ulsh et al. |
| 6,433,481 B1 | | 8/2002 | Marutsuka |
| 6,788,463 B2 | | 9/2004 | Merrill et al. |
| 6,869,557 B1 | * | 3/2005 | Wago et al. ................. 264/293 |
| 7,160,583 B2 | * | 1/2007 | Frey et al. .................... 427/437 |
| 2003/0162316 A1 | * | 8/2003 | Zangmeister et al. ......... 438/48 |
| 2004/0097072 A1 | * | 5/2004 | Carter et al. ................ 438/678 |
| 2006/0115623 A1 | | 6/2006 | Aizenberg et al. |
| 2008/0095988 A1 | * | 4/2008 | Frey et al. .................... 428/173 |

FOREIGN PATENT DOCUMENTS

| | | |
|---|---|---|
| WO | WO 97/34025 | 9/1997 |
| WO | WO 2006/062575 | 6/2006 |

OTHER PUBLICATIONS

Nakanishi, et al "Site-Selective Deposition of Magnetite Particulate Thin Films on Patterned Self-assembled Monolayers", Chem. Mater. 2004, vol. 16, No. 18, pp. 3484-3488.*

A. Ulman, "Formation and Structure of Self-Assembled Monolayers," *Chem. Rev.* 96 pp. 1533-1554 (1996).

M. J. Pellerite et al., "Effects of Fluorination on Self-Assembled Monolayer Formation from Alkanephosphonic Acids on Aluminum: Kinetics and Structure," *Journal of Physical Chemistry B* 107 pp. 11726-11736 (2003).

Moffat T. P., et al., "Patterned Metal Electrodeposition Using an Alkanethiolate Mask", Journal of the Electochemical Society, Electrochemical Society, Manchester, New Hampshire, US, vol. 142, No. 11, Nov. 1995, pp. L220-L222, XP002021700, issn: 0013-4651.

Aizenberg, J., "Patterned crystallization on self-assembled monolayers with integrated regions of disorder", J. Chem. Soc., pp. 3963-3968, 2000.

L. Santinacci, et al, *Surface Science*, 2005, vol. 597, pp. 11-19.

* cited by examiner

MICROFABRICATION USING REPLICATED PATTERNED TOPOGRAPHY AND SELF-ASSEMBLED MONOLAYERS

BACKGROUND

The present disclosure relates to a method of fabricating patterned metallic deposits on substrates and the articles so fabricated.

Polymeric films with patterns of metallic material have a wide variety of commercial applications. In some instances, it is desired that a conductive grid be sufficiently fine to be invisible to the unaided eye and supported on a transparent polymeric substrate. Transparent conductive sheets have a variety of uses including, for example, resistively heated windows, electromagnetic interference (EMI) shielding layers, static dissipating components, antennas, touch screens for computer displays, and surface electrodes for electrochromic windows, photovoltaic devices, electroluminescent devices, and liquid crystal displays.

The use of essentially transparent electrically conductive grids for such applications as EMI shielding is known. The grid can be formed from a network or screen of metal wires that are sandwiched or laminated between transparent sheets or embedded in substrates (U.S. Pat. Nos. 3,952,152; 4,179,797; 4,321,296; 4,381,421; 4,412,255). One disadvantage of using wire screens is the difficulty in handling very fine wires or in making and handling very fine wire screens. For example, a 20 micron diameter copper wire has a tensile strength of only one ounce (28 grams force) and is therefore easily damaged. Wire screens fabricated with wires of 20 micron diameter are available but are very expensive due to the difficulty in handling very fine wire.

Rather than embed a preexisting wire screen into a substrate, a conductive pattern can be fabricated in-situ by first forming a pattern of grooves or channels in a substrate and then filling the channels with a conductive material. This method has been used for making conductive circuit lines and patterns by a variety of means, although usually for lines and patterns on a relatively coarse scale. The grooves can be formed in the substrate by molding, embossing, or by lithographic techniques and then filling the grooves with conductive inks or epoxies (U.S. Pat. No. 5,462,624), with evaporated, sputtered, or plated metal (U.S. Pat. Nos. 3,891,514; 4,510,347; 5,595,943), with molten metal (U.S. Pat. No. 4,748,130), or with metal powder (U.S. Pat. Nos. 2,963,748; 3,075,280; 3,800,020; 4,614,837; 5,061,438; 5,094,811). Conductive grids on polymer films have been made by printing conductive pastes (U.S. Pat. No. 5,399,879) or by photolithography and etching (U.S. Pat. No. 6,433,481). These prior methods have limitations. For example, one problem with conductive inks or epoxies is that the electrical conductivity is dependent on the formation of contacts between adjacent conductive particles, and the overall conductivity is usually much less than that of solid metal. Vapor deposition of metal requires expensive equipment and electroplating presents challenges to uniformity and both often require a subsequent step to remove excess metal that is deposited between the grooves. Molten metal can be placed in the grooves but usually requires the deposition of some material in the grooves that the metal will wet. Otherwise the molten metal will not penetrate nor stay in the grooves due to surface tension of the molten metal.

Circuits have been made by placing metal powder into grooves followed by compacting the powder to enhance electrical contact between the particles. Lillie et al. (U.S. Pat. No. 5,061,438) and Kane et al. (U.S. Pat. No. 5,094,811) have used this method to form printed circuit boards. However, these methods are not practical for making fine circuits and metal patterns. On a fine scale, replacing or re-registering the tool over the embossed pattern to perform the metal compaction is difficult. For example, a sheet with a pattern of 20 micron wide channels would require that the tool be placed over the pattern to an accuracy of roughly three micrometers from one side of the sheet to the other. For many applications, the sheet may be on the order of 30 cm by 30 cm. Dimensional changes due to thermal contraction of a thermoplastic sheet are typically about one percent or more during cooling from the forming temperature to room temperature. Thus, for a 30 cm by 30 cm sheet, a contraction of one percent would give an overall shrinkage of 0.3 cm. This value is 1000 times larger than the three micrometer placement accuracy needed, making accurate repositioning of the tool difficult.

SUMMARY

The present disclosure relates to articles that include a substrate with a patterned metallic deposit. More specifically, the articles are prepared by selectively and electrolessly depositing a metal onto a substrate having a metallic surface that further includes selected regions with nanoscale topography (i.e., a metallic patterned-nanostructure surface).

A first aspect relates to a method that includes providing a tool having a patterned-nanostructure surface having a nanostructured surface region that includes nanoscale topography formed by an electroplating process; replicating the tool patterned-nanostructure surface onto a substrate to form a substrate patterned-nanostructure surface having a substrate nanostructured surface region; disposing a metal layer on the substrate patterned-nanostructure surface to form a metallic patterned-nanostructure surface having a metallic nanostructured surface region; forming a self-assembled monolayer on the metallic patterned-nanostructure surface, including the metallic nanostructured surface region; exposing the self-assembled monolayer to an electroless plating solution including a deposit metal; and depositing electrolessly the deposit metal selectively on the metallic nanostructured surface region.

Another aspect relates to a method that includes providing a tool having a patterned-nanostructure surface having a nanostructured surface region that includes nanoscale topography formed by an electroplating process; embossing a patterned-nanostructure surface, with the tool, onto a substrate metallic surface, to form a substrate metallic patterned-nanostructured surface having a metallic nanostructured surface region; forming a self-assembled monolayer on the substrate metallic patterned-nanostructure surface, including the metallic nanostructured surface region; exposing the self-assembled monolayer to an electroless plating solution comprising a deposit metal; and depositing electrolessly the deposit metal selectively on the metallic nanostructured surface region.

Another illustrative aspect relates to an article containing a substrate having a substrate surface including a region in the form of a linear trace having nanoscale topographical features, the region having an average width in a range from 1 to 50 micrometers. The nanoscale topographical features have an average size in a range from 10 to 500 nanometers. A deposit metal is selectively disposed on the region having the nanoscale topographical features and forms a deposit metal linear trace with lateral edge roughness less than 20 percent of the width of the deposit metal linear trace.

The above summary of the present invention is not intended to describe each disclosed embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to a method of fabricating patterned metallic materials on substrates and the articles so fabricated. More specifically, metallic deposits are patterned on substrates having a metallic patterned-nanostructure surface.

For the following defined terms, these definitions shall be applied, unless a different definition is given in the claims or elsewhere in this specification.

"Region" refers to a contiguous fractional portion of an entire surface, e.g., of a substrate surface.

The terms "deposit metal" and "metallic deposit" and "deposited metal" are used interchangeably and refer to a metal deposited on a substrate (i.e., a substrate having a metallic patterned-nanostructure surface). The deposit metal is usually formed from an electroless plating solution. The deposit metal can be in the form of a pattern such as linear traces in an electrical circuit, contact pads on an electrical device, and large-area coatings.

A "patterned-nanostructure surface" is a surface that has at least one region that includes nanoscale topography, as well as at least one region that does not include the nanoscale topography.

A surface region can be described as having a "nanoscale topography," or as having a "nanostructure," or to be "nanostructured," if it includes one or more nanoscale topographical features.

A "topographical feature" refers to an intentional geometric deviation from smoothness for a substrate surface. It is understood that all materials exhibit some topography, according to a general definition of the term, topography. However, a "topographical feature," as used herein, does not include a number of types of incidental topography that will be familiar to those skilled in the art. A "topographical feature" does not include incidental variations in surface elevation at the atomic scale. A "topographical feature" also does not include the incidental, gradual changes in surface elevation that commonly exist over a large area of material, with respect to an average elevation over said large area. For example, "topographical features" do not include smoothly varying undulations with "peak-to-valley" height that is substantially smaller in size than their spatial separation. A surface which includes only the aforementioned incidental forms of topography is considered nominally smooth. A nominally smooth surface may be flat or curved, where the curvature is less than 0.1 (micrometer)$^{-1}$. A "topographical feature" can include a protrusive or intrusive geometric element, or both. An example of a linear protrusive geometric element that may exist as part of the topographical features of a substrate surface is a peaked ridge that extends above an otherwise nominally smooth surface. Another example of a linear protrusive geometric element that may exist as part of the topographical features of a substrate surface is a square ridge that extends above an otherwise nominally smooth surface. An example of a linear intrusive geometric element that may exist as part of the topographical features of a substrate surface is a groove, with square or triangular cross-section for example, that extends below an otherwise nominally smooth surface.

A nanoscale topographical feature has a size (i.e., height or width) in a range from 5 nanometers to 950 nanometers, or from 10 nanometers to 750 nanometers, or from 10 nanometers to 500 nanometers, or from 20 nanometers to 400 nanometers, or from 25 nanometers to 250 nanometers.

Optionally, a patterned-nanostructure surface may include topographical features that are larger in size than the nanoscale topographical features. A microscale topographical feature has a size (i.e., height or width) in a range from 1 micrometer to 1 millimeter, or from 2 micrometers to 100 micrometers, or from 5 micrometers to 75 micrometers, or from 10 micrometers to 50 micrometers, or from 5 micrometers to 25 micrometers.

Conveniently, the regions of a patterned-nanostructure surface that include nanoscale topography may reside on regions that are raised or recessed with respect to adjacent regions that lack the nanoscale topography. In the latter case, the nanoscale topographical features can be said to reside on microscale topographical features. Examples of regions that are raised or recessed with respect to adjacent regions include linear ridges or trenches, respectively.

Figure 5:
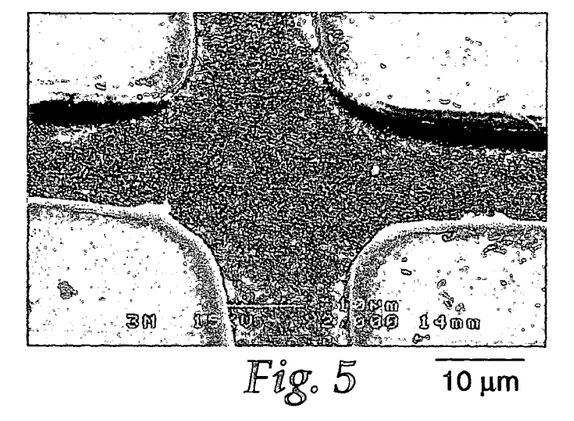
FIG. 5 is a scanning electron photomicrograph of an illustrative replicated metallic patterned-nanostructure surface formed in Example 1.
Figure 6:
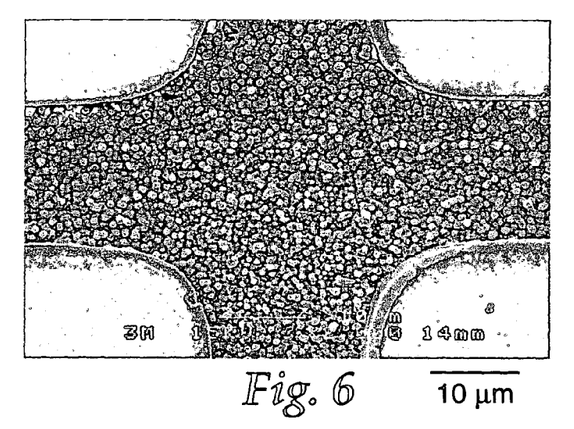
FIG. 6 is a scanning electron photomicrograph of the replicated structure shown in FIG. 5 following selective deposition of copper.

Depositing a metal "selectively," refers to depositing metal on a surface region and not depositing the metal on another surface region. For a metal to be deposited selectively on a substrate surface, it is not deposited on the entire substrate surface. That is, the deposit metal forms a pattern on the substrate surface. FIGS. 5 and 6 illustrate selective deposition of copper on a gold-coated substrate. For example, the metal can be deposited on a topographical feature of a metallic surface (i.e., the deposit metal is not deposited in regions on the metallic surface that are nominally smooth).

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a metal" includes a mixture of two or more metals. As used in this specification and the appended claims, the term "or" is generally employed in its sense including "and/or" unless the content clearly dictates otherwise.

Unless otherwise indicated, all numbers used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

This disclosure generally relates to methods for forming patterns of metallic deposits (e.g., deposit trace) on substrates having a metallic patterned-nanostructure surface. In some embodiments, the deposit material is electrolessly deposited on a substrate only in selected regions on the surface of the substrate. These selected regions can exhibit a regular or repeating geometric arrangement on the substrate, for example an array of polygons or a pattern of traces that define discrete undeposited areas that include an array of polygons. In other embodiments, the selected regions may exhibit a random arrangement on the substrate, for example a random net of traces that define the boundaries of irregular shapes for undeposited areas. In yet another embodiment, the selected regions may exhibit an arrangement that is not regular, repeating, or random, but that is a specified design which includes or lacks symmetry or repeating shapes. A material deposit that is patterned may exist on only one region of the substrate surface or it may exist on more than one region of the substrate surface; but to be patterned it may not exist on all regions of the substrate surface.

A substrate with a patterned-nanostructure surface can take a number of different forms. In one embodiment, the substrate surface includes regions which are smooth and lack nanoscale topography, together with regions that have nanoscale topography in the form of a nanoscale texture. This texture can include defined geometric elements such as ridges, pyramids, posts, or grooves. Alternatively, the texture may include randomly shaped geometric elements. Surface regions including nanoscale topography in the form of nanoscale texture can have associated with them a spatially averaged elevation with respect to the adjacent regions of the surface that are smooth, possibly flat, and lack nanoscale topographical features. Spatially averaged elevation of nanoscale textured regions of the substrate surface may lie below or above the elevation of adjacent smooth and possibly flat regions of the substrate surface. Such textured regions can recess from or protrude from the adjacent regions, respectively.

A patterned metal deposit on a substrate, where the arrangement of surface regions that include the metal deposit is determined according to the topographical features of the substrate, may exhibit one of a number of spatial relationships to the topographical features. For example, for regions that include nanoscale topographical features, each region can include a single geometric element spaced apart by adjacent regions that lack nanoscale topographical features, and the patterned metal deposit may be selectively deposited onto the individual topographical features. In the latter case, the pattern of the metal deposit would be substantially identical to the pattern of the individual topographical features. Alternatively, if nanoscale topographical features are closely spaced in a region of the substrate, the metal deposit may bridge individual geometric or topographical elements in the regions including topographical features. If a substrate patterned-nanoscale surface includes regions with nanoscale topography in the form of texture that is made up of multiple closely spaced topographical features, together with regions that lack such texture, a patterned metal deposit may bridge the closely spaced nanoscale topographical features that form the texture, leading to a contiguous deposit in the entire region with nanoscale topography in the form of the texture.

The current process is particularly useful for generating articles (e.g., polymer films) where the metal deposit that is formed on a surface region that includes nanoscale topography in the form of texture is recessed with respect to the adjacent regions that lack the nanoscale texture and the deposit metal. In this case, the deposit metal may be regarded as being inlayed with respect to the substrate surface. Such a recessed deposit will adhere more effectively to the substrate and not be subjected to mechanical stresses that are as severe as would be expected in a case where the deposit metal protrudes with respect to adjacent regions on the substrate surface that lack the nanoscale topography in the form of texture and that lack the deposit metal. An inlayed metal deposit can be more easily overcoated (e.g, with a protective polymer layer) or wire-bonded (e.g., ultrasonic wire-bonded).

Methods for generating articles with patterned-nanostructure surfaces include the use of a mechanical tool. Illustrative mechanical tools transfer a patterned-nanostructure surface to the substrate by embossing or molding the nanostructure pattern onto the substrate surface.

Particularly advantageous approaches for the preparation of a patterned-nanostructure surface include replication or forming a patterned-nanostructure surface with a mechanical tool. Mechanical tools form a patterned-nanostructure surface by embossing or molding the patterned-nanostructure onto the substrate surface. Replication includes the transfer of surface structural features from a master tool to another material and includes embossing or molding. Methods involving replication are noteworthy for the ease and speed with which structured surfaces can be generated. Also noteworthy is the small size that can be achieved for surface structure features that are generated through replication.

Replication can be achieved in any number of ways. One illustrative method for replicating the surface structural features of a master mechanical tool into the surface of another material is through thermal embossing (M. J. Ulsh, M. A. Strobel, D. F. Serino, and J. T. Keller, U.S. Pat. No. 6,096,247 "Embossed Optical Polymeric Films" (2000)) (D. C. Lacey, U.S. Pat. No. 5,932,150 "Replication of Diffraction Images in Oriented Films" (1999)). Thermal embossing involves the pressing of a master mechanical tool against a deformable material, causing the surface structure of the master tool to deform the surface of the deformable material, thereby generating a negative replica of that master tool surface. Materials that can be embossed with surface structure include, for example, soft metals and organic materials, including polymers. Examples of soft metals that can be embossed include indium, silver, gold, and lead. Polymers suitable for thermal embossing include thermoplastics. Examples of thermoplastics include polyolefins, polyacrylates, polyamides, polyimides, polycarbonates, and polyesters. Further examples of thermoplastics include polyethylene, polypropylene, polystyrene, poly(methylmethacrylate), polycarbonate of bisphenol A, poly(vinyl chloride), poly(ethylene terephthalate), and poly(vinylidene fluoride). For the preparation of thermally embossed materials, it is often convenient and useful to start with material in film form. Optionally, a film for embossing can include multiple layers (J. Fitch, J. Moritz, S. J. Sargeant, Y. Shimizu, and Y. Nishigaki, U.S. Pat. No. 6,737,170 "Coated Film with Exceptional Embossing Characteristics and Methods for Producing It" (2004)) (W. W. Merrill, J. M. Jonza, O. Bensen, A. J. Ouderkirk, and M. F. Weber, U.S. Pat. No. 6,788,463, "Post-Formable Multilayer Optical Films and Methods of Forming" (2004)).

Another approach for replicating the surface structure of a master mechanical tool into the surface of polymer is to cure a flowable precursor to the polymer while in contact with the master mechanical tool. Curing a flowable precursor to a polymer while in contact with the master mechanical tool is one form of molding. Examples of flowable precursors include neat monomers, mixtures of monomers, solutions of monomers or polymers that may include removable solvent, and uncrosslinked polymers. Generally, a precursor to the cured polymer can be cast onto a master mechanical tool or into a mold, followed by curing (J. A. Martens, U.S. Pat. No. 4,576,850 "Shaped Plastic Articles Having Replicated Microstructure Surfaces" (1986)). Curing refers to the development of increased elastic modulus, usually by way of a chemical reaction. Curing to increase elastic modulus can include heating, addition of a catalyst, addition of an initiator, or exposure to ultraviolet light, visible light, infrared light, X-rays, or an electron beam. Once the polymer has been cured, it can be removed as a solid from contact with the master tool or mold. Examples of polymers suitable for molding include polyacrylates, polyimides, epoxies, silicones, polyurethanes, and some polycarbonates.

In many embodiments, the master mechanical replication tool has a patterned-nanostructure surface. The nanoscale topographical features can be disposed on a microscale topographical feature. In many embodiments, the nanostructure features described herein are formed by an electroplating process. One exemplary tool and method of forming the tool are described with FIG. 1.

The substrate can be formed from any suitable material. In some embodiments, the substrate is formed of metal or organic materials, including polymers. Examples of metal include indium, silver, gold, and lead. Examples of polymers include thermoplastic polymers. Examples of thermoplastic polymers include polyolefins, polyacrylates, polyamides, polycarbonates, and polyesters. Further examples of thermoplastics include polyethylene, polypropylene, polystyrene, poly(methylmethacrylate), polycarbonate of bisphenol A, poly(vinyl chloride), poly(ethylene terephthalate), poly(vinylidene fluoride).

In other embodiments, the substrate is formed from glass, glass-ceramic, ceramic, or semiconductor materials. Examples of useful glass materials include silicates, germanates, phosphates, and chalcogenides. Among silicates, soda-lime-silica and borosilicate glasses can be useful. Fused silica is also a useful substrate material. Germanate and chalcogenide glasses are particularly useful for applications where increased infrared transmission is desired, compared with silicate glasses. Phosphate glasses generally exhibit conveniently low forming temperature, but often also exhibit lower chemical durability. Other network-formers and modifiers in useful glasses include aluminum oxide, antimony pentoxide, tantalum oxide, niobium oxide, lead oxide, bismuth oxide, zinc oxide, magnesium oxide, strontium oxide, barium oxide, lithium oxide, and potassium oxide. Glass-ceramics that include a crystallized microstructure, formed through devitrification of a glassy material, are also useful as substrate materials. Examples of useful glass-ceramic materials include lithium disilicate, beta-quartz, enstatite, cordierite, spinel, beta-spodumene, beta-eucryptite, and apatite compositions. Glass-ceramic materials offer the convenience of glass-formability, together with the high strength and toughness. Substrates can also include ceramic materials. Examples of useful ceramic materials include barium titanate, barium strontium titanate, lead zirconate titanate, bismuth titanate, aluminum oxide, beryllium oxide, aluminum nitride, and silicon carbide. Examples of useful semiconductor materials include group IV elements, binary compounds of group II and group VI elements, binary compounds of group III and group V elements, and their various alloys. Examples of useful semiconductor materials include silicon, germanium, gallium arsenide, indium phosphide, zinc sulfide, and cadmium telluride. Substrates can include materials from more than one class of materials including glass, glass-ceramic, ceramic, and semiconductor materials. For example, substrates can include a semiconductor crystal with a coating of a glass or ceramic material.

A "self-assembled monolayer" refers to single layer of molecules that are attached (e.g., by a chemical bond) to a surface and that have adopted a preferred orientation with respect to that surface. In many examples, self-assembled monolayers have been shown to cover surfaces so completely that the properties of that surface are changed. For example, application of a self-assembled monolayer can result in a surface energy reduction.

Examples of chemical species that are suitable for forming self-assembled monolayers include organosulfur compounds, silanes, phosphonic acids, benzotriazoles, and carboxylic acids. Examples of many such compounds are discussed in the review by Ulman (A. Ulman, "Formation and Structure of Self-Assembled Monolayers," *Chem. Rev.* 96 1533-1554 (1996)). In addition to organic compounds, certain organometallic compounds are useful for forming self-assembled monolayers. Examples of organosulfur molecules that are suitable for forming self-assembled monolayers include alkyl thiols, dialkyl disulfides, dialkyl sulfides, alkyl xanthates, dialkylthiocarbamates. Examples of silane molecules that are suitable for forming self-assembled monolayers include organochlorosilanes and organoalkoxysilanes. Examples of phosphonic acid molecules that are suitable for forming self-assembled monolayers are discussed by Pellerite et al. (M. J. Pellerite, T. D. Dunbar, L. D. Boardman, and E. J. Wood, "Effects of Fluorination on Self-Assembled Monolayer Formation from Alkanephosphonic Acids on Aluminum: Kinetics and Structure," *Journal of Physical Chemistry B* 107 11726-11736 (2003)). Chemical species that are suitable for forming self-assembled monolayers can include, for example, hydrocarbon compounds, partially fluorinated hydrocarbon compounds, or perfluorinated compounds. The self-assembled monolayer can include two or more different chemical species. In the use of two or more different chemical species, the chemical species may exist in the self-assembled monolayer as a mixture or with a phase-separated morphology.

Illustrative useful molecules for forming a self-assembled monolayer include, for example, $(C_3\text{-}C_{20})$alkyl thiols, $(C_{10}\text{-}$ $C_{20}$)alkyl thiols or ($C_{15}$-$C_{20}$)alkyl thiols. The alkyl groups can be linear or branched and can be substituted or unsubstituted with substituents that do not interfere with the formation of a self-assembled monolayer.

The self-assembled monolayer can be formed on a metal surface using a variety of methods. For example, the metal surface can be dipped into a solution that contains the chemical species, the metal surface can be sprayed with a solution that contains the chemical species, or the metal surface can be exposed to the chemical species in a vapor phase. Any excess of the chemical species that is not attached to the metal surface can be removed, for example, by rinsing with a suitable solvent. Another method for forming a self-assembled monolayer on a surface is to transfer the molecules to the metal surface by contacting the metal surface with a solid material (e.g., an elastomer) that has been loaded with the molecules on its surface or within its bulk. A useful elastomer for contact transfer of molecules that form self-assembled monolayers is polydimethylsiloxane (PDMS).

Metallic surfaces can be used to support a self-assembled monolayer. The metal surface can include, for example, elemental metal, metal alloys, intermetallic compounds, metal oxides, metal sulfides, metal carbides, metal nitrides, and combinations thereof. Examplary metallic surfaces for supporting self-assembled monolayers include gold, silver, palladium, platinum, rhodium, copper, nickel, iron, indium, tin, tantalum, as well as mixtures, alloys, and compounds of these elements.

The term "electroless deposition" refers to a process for the autocatalytic plating of metals. It involves the use of an electroless plating solution that contains a soluble form of the deposit metal together with a reducing agent. The soluble form of the deposit metal is usually an ionic species or a metal complex (i.e., a metal species coordinated to one or more ligands.) In many embodiments, electroless deposition does not include the application of electrical current to a work piece that is being coated. The volume by Mallory and Hajdu describes the process in detail, (*Electroless Plating—Fundamentals and Applications*, Ed. G. O. Mallory and J. B. Hajdu, William Andrew Publishing, Norwich (1990)). The steps involved in electroless plating include the preparation of a substrate with a catalytic surface (e.g., a metallic microstructured surface), followed by immersion of the substrate in an appropriate plating bath. The catalytic surface catalyzes the deposition of metal from solution. Once started, plating proceeds by the continued reduction of the solution metal source, catalyzed by its own metal surface, hence the term "autocatalytic." Metallic deposits that can be formed using electroless deposition include copper, nickel, gold, silver, palladium, rhodium, ruthenium, tin, cobalt, zinc, alloys of these metals with each other or with phosphorous or boron, as well as compounds of these metals with each other or with phosphorous or boron. Suitable reducing agents include, for example, formaldehyde, hydrazine, aminoboranes, and hypophosphite. Suitable metallic microstructured surfaces for catalysis of electroless deposition include palladium, platinum, rhodium, silver, gold, copper, nickel, cobalt, iron, and tin, as well as alloys and compounds of the elements with each other or with other elements. The deposit metal and the metal included in the metallic microstructure surface can be the same or different.

Not wishing to be bound by any particular theory, it is presumed that a topographical feature (e.g., nanostructure) on a surface can be sufficiently disruptive to the structure of a self-assembled monolayer attached to the surface such that the ability of the self-assembled monolayer to alter the properties of that surface is compromised. For example, a gold surface is known to have both the property of supporting self-assembled monolayers and the property of catalyzing electroless deposition of metals. In the past, it has been shown that a self-assembled monolayer on gold will block its catalytic activity with regard to electroless plating (A. Kumar and G. M. Whitesides, U.S. Pat. No. 5,512,131, "Formation of Microstamped Patterns on Surfaces and Derivative Articles," (1996)).

Further, it is presumed that the topographical features for a metal surface, such as gold, can interfere with the ability for self-assembled monolayers to block the catalytic activity, thus forming the basis for methods of patterning. The topographical features that lead to such apparent disruption in catalytic activity can be generated through the convenient replication methods of embossing or molding.

Figure 1:
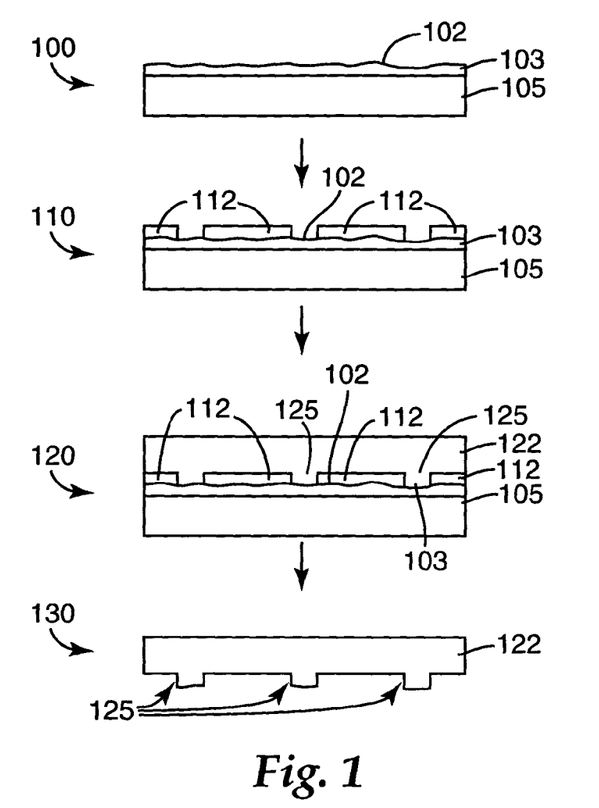
FIG. 1 is a schematic diagram of an illustrative method of forming a microreplication tool.

FIG. 1 is a schematic diagram of an illustrative method of forming an illustrative microreplication tool 122. A metal is electroplated 100 onto a substrate 105 to form a layer 103 having a surface 102, having nanoscale topographical features in the form of a nanoscale texture. In one embodiment, the nanostructured surface 102 are formed by electroplating copper. The electroplated surface is prepared using an overpotential to generate structured surfaces in a controllable way.

The rate of electrodeposition depends on, among other things, the composition and concentration of the electroplating solution, time, the chemical nature of the substrate being electroplated, and the current density. Some differentiation in the exact shape of the nodules may be observed, for example, depending on the exact conditions chosen or depending on the specific composition of the substrate. Accordingly, in order to determine current density and time for a given substrate and electroplating solution that are suitable to generate a tool having nanostructures, a Hull Cell electroplating procedure may be used. In this procedure, a plate of substrate material is mounted in a Hull Cell filled with the electroplating solution such that at least a portion of the plate is immersed in the electroplating solution. Current (e.g., 1, 2, 3, or 5 amps) is applied until the immersed portion of plate has a polished copper finish on the end with lowest current density, and a dark brownish-blackish finish on the end with highest density. Under typical conditions this may be accomplished in 30 seconds to 5 minutes, although longer and shorter times may be used. Generally, using this technique, conditions which will generate structured surfaces having a copper layer with discrete copper nodules or nanostructure, where at least 80 percent of the nodules have a maximum width in a range of from 100 nanometers to less than 1 micrometer. Within this region, analysis by electron microscopy can readily determine the conditions that generate nanostructured surfaces. Hull Cells and ancillary gauges and procedures for use may be commercially obtained from Kocour Company, Chicago, Ill.

Once suitable electroplating conditions are known, those conditions are used to electroplate copper onto a substrate having a metallic surface. In many embodiments, the metallic surface is an outer major surface, which is continuous and/or endless (e.g., as in a roll or belt), although this is not a requirement. Examples of suitable substrates include plates, rolls, sleeves, and belts having a metallic surface. The metallic surface may be, for example, a layer of thin layer of metal bonded to a metallic or non-metallic body (e.g., as in the case of a belt), or simply a surface of a metallic substrate (e.g., a in the case of a metal roll). Examples of suitable metals include copper, nickel, brass, and steel.

The copper plating solution used in this invention can be any solution so long as it can plate copper electrolytically. Examples include solutions containing one or more of copper sulfate, copper cyanide, copper alkanesulfonate and copper pyrophosphate, but other solutions may also be used. Matters such as the composition and ingredients of other plating solutions can be decided easily by persons skilled in the art from the following description of a copper sulfate plating solution and from published sources. Copper electroplating solutions are also widely available from commercial vendors.

Generally, the copper layer is deposited on the metallic surface of the substrate by at least partially, typically at least substantially completely, immersing the metallic surface in the copper electroplating solution, while applying a relatively negative potential to the metallic surface (i.e., configured as the cathode in an electrolytic cell). An anode, which has a relatively higher potential (e.g., a positive potential) and that is immersed in the copper electroplating solution, and an external power supply complete the electrical circuit. Electroplating is terminated when the desired copper electroplating conditions are achieved, for example, as determined using a Hull Cell as described hereinabove.

As shown in FIG. 1, the next step is to pattern at least one region with the nanoscale topography by any useful method. In one embodiment illustrated, a secondary microscale topography structure that defines regions that lack the nanoscale topography is formed by applying 110 a photoresist material 112 onto the surface 102 and exposing the photoresist material 112 to UV light using an overlying photomask with a desired configuration to remove portions of the photoresist material 112 and expose a portion of the surface 102.

Then, a metal 122 can be formed 120 (e.g., electroformed) onto the exposed surface 102 and photoresist material 112. The metal 122 then has protrusive microscale topographical features 125 that include surface bearing nanoscale topography that has been transferred from the exposed surface 102. The metal 122 can be removed 130 from the exposed surface 102 and photoresist material 112 and used as the master replication tool 122.

Figure 2:
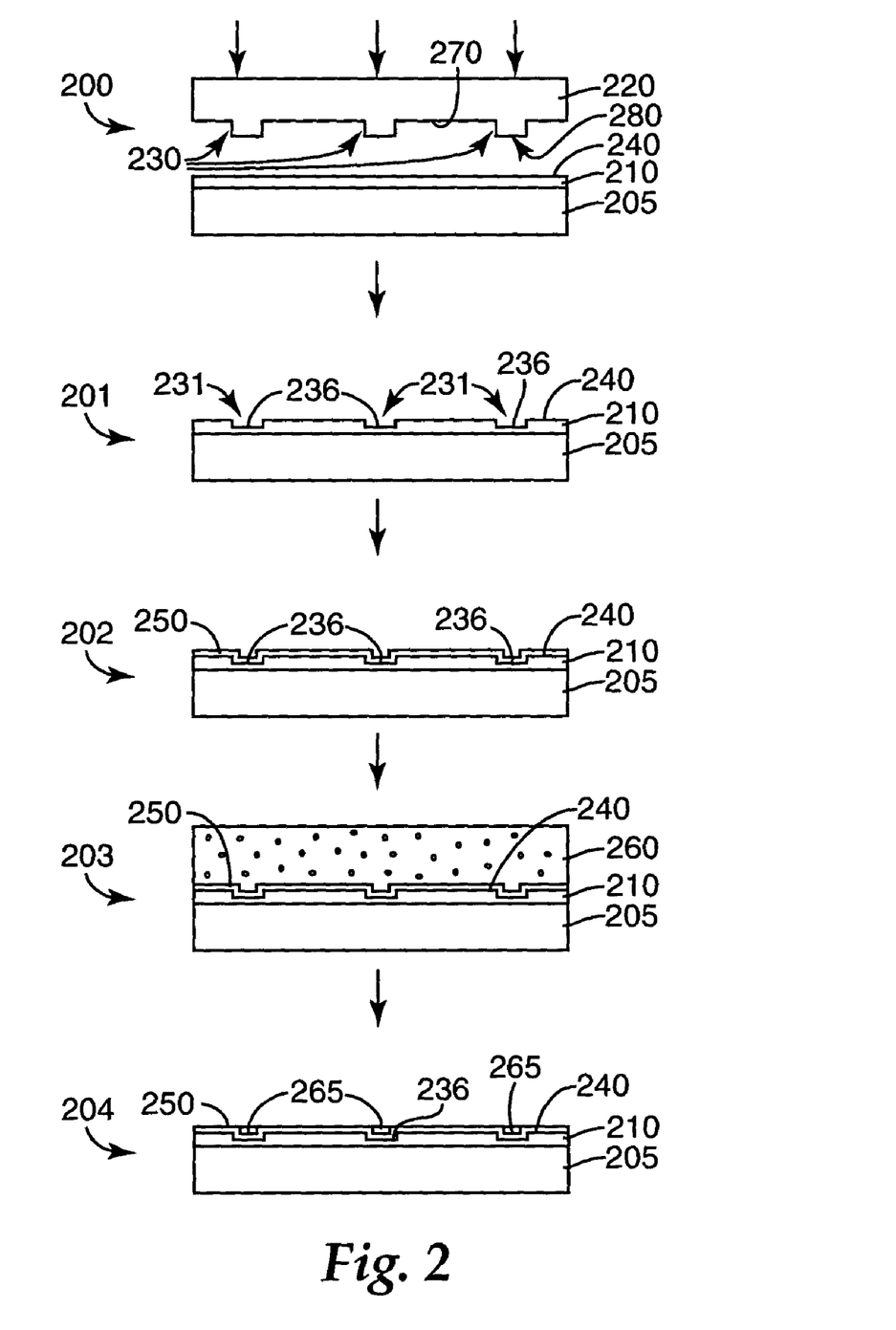
FIG. 2 is a schematic diagram of an illustrative method of microfabrication using replicated and patterned topography and self-assembled monolayers.

FIG. 2 is a schematic diagram of an illustrative method of microfabrication using patterned topography and self-assembled monolayers. A substrate 205 includes a metal layer 210 disposed on the substrate 205. In one embodiment, the substrate 205 is formed from a polymeric material and the metal layer 210 is formed from a metal. In many embodiments, the metal layer 210 is a continuous homogenous metal layer. In one embodiment, the continuous homogenous metal layer 210 is formed from a single metal or alloy.

The master replication mechanical tool (described above) 220 is shown having a protrusive microscale topographical feature 230 (where the microscale topographical feature 230 includes a nanostructured surface 280) on the lower surface as-drawn of the mechanical tool 220. Regions 270 of the lower surface as-drawn of mechanical tool 220 adjacent to microscale topographical feature 230 lack a nanostructured surface. The mechanical tool 220 can be applied to a surface 240 of the metal layer 210 such that the mechanical tool 220 lower surface as-drawn is in contact with the surface 240 of the metal layer 210. In one embodiment, pressure (as shown by the downward arrows) is applied to the mechanical tool 220 such that the topographical feature 230 is transferred to or embossed onto the surface 240 of the metal layer 210 forming a replicated topographical feature 231 in the metal layer 210 surface 240. This mechanically replicated topographical feature 231 defines a surface region having a nanostructured surface 236. A patterned-nanostructure article 201 includes the substrate supporting a metallic patterned-nanostructure surface 240 having surface region 236 having nanoscale topographical features.

A self-assembled monolayer 250 is formed 202 on the metallic patterned-nanostructure surface 240, as described above. In this embodiment, the self-assembled monolayer 250 is shown disposed across the entire surface 240 of the metal layer 210. The self-assembled monolayer 250 can be uniformly disposed along the metal layer 210 surface 240. The self-assembled monolayer 250 can have areas of disruption on or adjacent to the replicated nanoscale topographical features that are included on the surface of replicated microscale topographical features 231.

The self-assembled monolayer 250 is exposed 203 to an electroless plating solution 260 including a deposit metal. The deposit metal can be deposited 204 selectively on the metallic surface region 236 to form a deposit metal pattern 265. In one embodiment, the deposit metal includes copper and the metallic surface region 236 is formed from gold. In some embodiments, at least a portion of the metal layer 210 can be removed via etching after deposition of the deposit metal.

While not wishing to be bound by any particular theory, it is believed that the areas of disruption in the self-assembled monolayer 250 allow the deposit metal to bond with the surface 240 of metal layer 210 at the disruption areas formed on or near the nanostructures.

Figure 3:
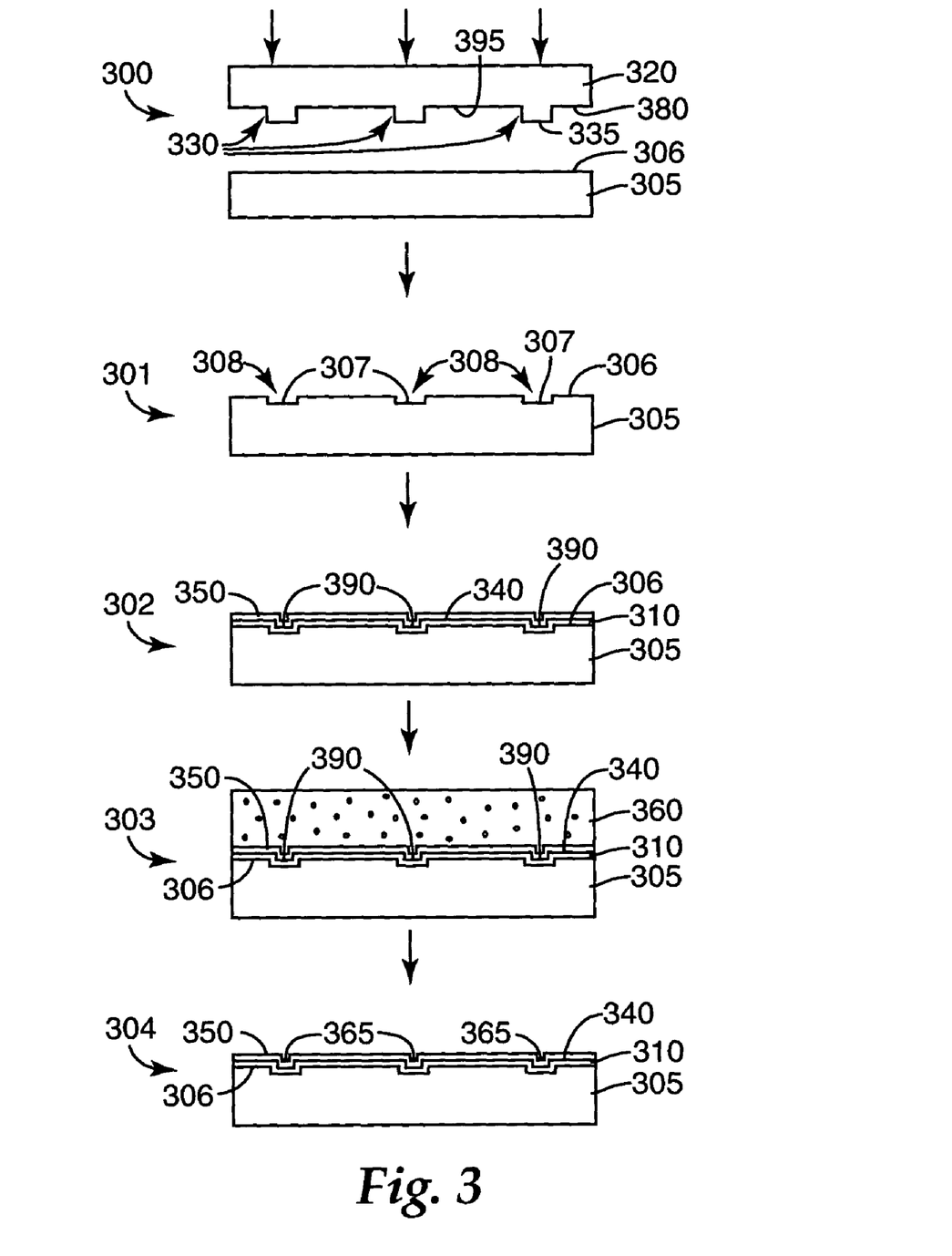
FIG. 3 is a schematic diagram of another illustrative method of microfabrication using replicated and patterned topography and self-assembled monolayers.

FIG. 3 is a schematic diagram of another illustrative method of microfabrication using patterned topography and self-assembled monolayers. A mechanical tool (described above) 320 is shown having a protrusive microscale topographical feature 330 (where the topographical feature 330 includes a nanostructured surface 335) formed on a first surface 380 of the mechanical tool 320. Regions 395 of the lower surface as-drawn of the mechanical tool 320 adjacent to the microscale topographical feature 330 lack a nanostructure surface. The mechanical tool 320 can be applied to a surface 306 of a substrate 305 such that the mechanical tool 320 first surface 380 is in contact with the surface 306 of the substrate 305. In one embodiment, pressure (as shown by the downward arrows) is applied to the replication tool 320 such that the topographical feature 330 (with its nanostructured surface 335) is transferred to the surface 306 of the substrate 305 forming 301 a replicated topographical feature 308 on the substrate 305 surface 306. This mechanically replicated topographical feature 308 defines a region having a nanostructured surface 307.

A metal layer 310 is then disposed 302 on the substrate surface 306 to form a metallic patterned-nanostructure surface 340. In one embodiment, the substrate 305 is formed from a polymeric material and the metal layer 310 is formed from a metal, including metallic nanostructured surface region 390. In many embodiments, the metal layer 310 is a continuous homogenous metal layer. In one embodiment, the continuous homogenous metal layer 310 is formed from a single metal or alloy.

A self-assembled mono-layer 350 is formed 302 on the metallic patterned-microstructured surface 340, as described above. The self-assembled mono-layer 350 is shown disposed on the entire surface 340 of the metal layer 310. In one embodiment, the self-assembled monolayer 350 is uniformly disposed along the metal layer 310 surface 340. The self-assembled monolayer 350 can have areas of disruption on or adjacent to the nanoscale topographical features of region 390. In at least some embodiments, the areas of disruption on or adjacent to the nanoscale topographical features of surface region 390 are caused by the nanostructure topography.

The self-assembled monolayer 350 is exposed 303 to an electroless plating solution 360 including a soluble form of a deposit metal. The deposit metal can be deposited 304 selectively on the metallic nanostructured surface region 390 of patterned-nanostructure surface 340 to form a deposit metal pattern 365. In one embodiment, the deposit metal includes copper and the metallic patterned-nanostructure surface 340 is formed from gold. In some embodiments, at least a portion of the metal layer 310 can be removed via etching after deposition of the deposit metal.

While not wishing to be bound by any particular theory, it is believed that the areas of disruption in the self-assembled monolayer 350 allow the deposit metal in the electroless plating solution 360 to bond with the metal layer 310 at the disruption areas formed on or near the topographical features of surface region 390.

Figure 4:
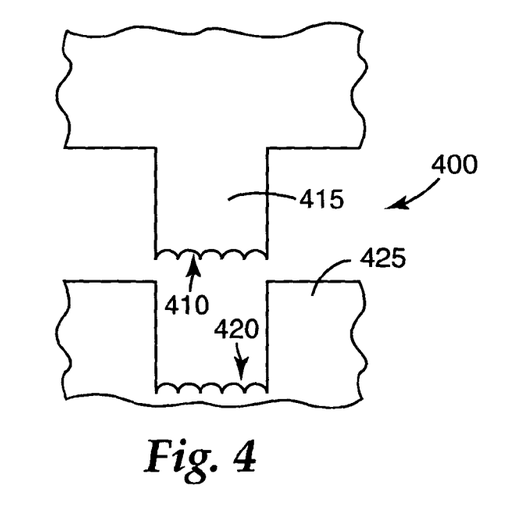
FIG. 4 is a schematic cross-sectional view of an illustrative replication process showing details of the patterned-nanostructure surfaces.

FIG. 4 is a schematic cross-sectional view of an illustrative replication process 400 showing details of the patterned nanostructure. The master replication tool includes a microscale topographical feature 415 and nanoscale topographical features 410 disposed on the microscale feature 415. The master replication tool creates replicated nanostructure 420 in a substrate 425 that is a negative of the master nanostructure 410. In many embodiments, each microscale feature 415 has a size from 5 to 250 times the size of each nanoscale feature 410. In some embodiments, each microscale feature 415 has a size from 10 to 150 times the size of each nanoscale feature 410. In one embodiment, each microscale feature 415 has a size from 5 to 20 micrometers and each nanoscale feature 410 has a size from 10 to 250 nanometers.

The deposit metal may be described as having an area shape and area size on the substrate surface, as well as thickness. The area shape of the deposit metal can exhibit a regular or repeating geometric arrangement on the substrate, for example an array of deposit metal polygons or a pattern of deposit metal traces that define the boundaries of discrete undeposited areas that may be an array of polygons. In other embodiments, the deposit metal shapes may exhibit a random arrangement on the substrate, for example a random net of traces that define the boundaries of irregular shapes for undeposited areas. In yet another embodiment, the deposit metal shapes may exhibit an arrangement that is not regular, repeating, or random, but that is a specified design which includes or lacks symmetry or repeating geometric elements. In one embodiment, a shape for the deposit metal that is useful for making a light-transmitting, electromagnetic interference (EMI) shielding material is a square grid, which includes traces of the deposit metal characterized by a width, thickness, and pitch. Other useful shapes for making a light-transmitting, EMI shielding material include continuous metallic traces that define open areas that have the shape of a regular hexagon and that are arranged in closely packed order.

In some embodiments, the smallest area dimension for the deposit metal shapes, for example the width of a linear trace of deposit metal, can range from 1 micrometer to 1 millimeter, or from 1 micrometers to 50 micrometers, or from 5 micrometer to 25 micrometers, or from 5 micrometer to 15 micrometers. In one illustrative embodiment for making a light-transmitting EMI shielding material, the width of linear traces of deposit metal is in a range from 5 micrometers to 15 micrometers; the thickness is in a range from 1 micrometer to 5 micrometers; and the pitch is between 25 micrometers to 1 millimeter. The largest area dimension for the deposit metal shapes above, for example the length of a linear trace of deposit metal, can range from 1 micrometer to 5 meters, or from 10 micrometers to 1 meter. For making a light-transmitting EMI shielding material, a sheet of EMI shielding material, the length of linear traces of deposit metal can be between 1 centimeter and 1 meter, for example.

In many embodiments, the deposit metal forms linear features or traces having an average width in a range from 1 to 50 micrometers, or from 1 to 25 micrometers and having an average lateral edge roughness in a range of less than 20% of the width, or less than 10% of the width. Thus, the linear traces have a uniform width along the length of each linear trace.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Unless otherwise noted, chemical reagents and solvents were or can be obtained from Aldrich Chemical Co., Milwaukee, Wis.

Example 1

Preparation of Replicated Substrate with a Patterned-Nanoscale Surface

A 0.5 mm thick copper sheet, 121 mm by 121 mm, with a smooth surface (Ra<100 nm) was dipped into a SVM&P Naphtha (Brenntag Great Lakes Company, St. Paul, Minn.) bath for two minutes, followed by dipping in acetone (Brenntag Great Lakes Company, St. Paul, Minn.) bath for one minute. The plate was rinsed with water and then isopropanol (Brenntag Great Lakes Company, St. Paul, Minn.) After the surface was blown dry with compressed air, the plate was laminated to a same-sized stainless steel plate using double sided adhesive tape (3M Company, St. Paul, Minn.) to form a composite substrate. Copper was electrolytically plated on the composite substrate which formed a copper nanostructure on the surface. Electrodeposition was performed on this composite substrate in a bath composed of: 50 grams per liter of copper sulfate, 80 grams per liter of sulfuric acid, and 2 grams per liter of polyethylene oxide. A current of 6.0 ampere was applied for 0.5 minutes.

After the electrodeposition, a negative photoresist material, Futurrex PR NP 1-3000PY (Futurrex Inc., Franklin, N.J.), was spin-coated on the copper surface at 2000 rpm for 30 seconds, ramping at 500 rpm/sec. The coated composite was heated on a hot plate to a temperature of approximately 80° C. for 5 minutes to remove solvent. The photoresist coating was overlaid with a photomask having a square grid pattern with a pitch of 200 micrometers and a line width of 12 micrometers and was then exposed under an ultraviolet lamp (Hg short arc lamp, Model HSA500E, Quintel Corp.) having an intensity of 14 mW per square cm at a wavelength of 400 nm. Post exposed photoresist-coated composite was then heated on a hot plate to a temperature approximately 130° C. for 8 minutes. The sample was then developed using the developer Futurrex RD6, batch # 1235 (Futurrex Inc., Franklin, N.J.), for approximately 35 seconds, and was rinsed in a deionized water bath for three minutes. This process generated a pattern of photoresist squares, separated by openings in the form of grid lines that revealed electroplated copper surface with nanoscale topographical features in the form of a nanoscale texture. The nanostructure had a feature size in a range of 100 to 200 nanometers.

This patterned photoresist covered substrate was adhered to a 483 millimeter diameter stainless steel disk with double-sided adhesive tape (3M Company, St. Paul, Minn.) Silver metal was deposited on the resist with a spray silvering process using a first solution including 125 grams of dextrose, 12 ml formaldehyde and 18.9 liters and a second solution including 20 grams of KOH, 100 ml $NH_4OH$, 45 grams $AgNO_3$, 18.9 liters water. Nickel electroforming was carried out as the first step to replicate the structure of the photoresist-covered substrate. The nickel electroforming was carried out at 54° C. and at a current density of 20 ampere per square foot in a bath having a pH of 4.0 that contained nickel sulfamate (Atotech, Rock Hill, S.C., U.S.A) 480 grams per liter, boric acid (National Boraxx Corp., Cleveland, Ohio, U.S.A) 35 grams per liter, and BARRETT SNAP L wetting agent (MacDermid, Inc., Waterbury, Conn.) 10 milliliters per liter. The nickel electroforming step was conducted for 20 hours and resulted in a nickel deposit that was 0.5 mm thick. The nickel deposit was then manually separated from the photoresist-covered substrate to afford a nickel replication tool. This nickel replication tool, with a patterned-nanostructure surface, was used as the tool for replicating the original nanostructured surface on polymers, as described below.

Thermo-compression molding was used to replicate the microstructure and nanostructure pattern into a polypropylene film (PP3155 ExxonMobil Chemical Co., Houston, Tex.) using a Wabash compression molding machine, Model V75H-24-CLX (Wabash MPI, Wabash, Ind.) The compression molding was carried out on a film sample having dimensions of 121 mm by 121 mm at a pressure of 1.53 MPa (222 psi), and a temperature of 180° C. for 10 minutes, and then the film sample was separated from the molding machine at temperature of about 50° C. The polypropylene film was then separated from the nickel replication nickel tool. This film was vapor-coated with 50 Angstroms of titanium and then with 600 Angstroms of gold. A scanning electron photomicrograph of this sample is shown in FIG. 5.

The titanium- and gold-coated sample rinsed with ethanol and then dried with air. The sample was immersed in a solution that was made by combining 90 volume percent deionized water with 10 volume percent of a solution of 10 millimolar hexadecanethiol in ethanol. The sample was then immersed in the electroless copper plating solution, which is described below, at 68° C. After 15 minutes, the sample was removed from the solution, rinsed with deionized water, and allowed to dry in air at room temperature.

The electroless copper plating solution was prepared in a polypropylene beaker by adding reagents in the following order and allowing time for each reagent to dissolve before adding the next reagent: 398.27 grams of deionized water, 2.43 grams of NaOH, 5.01 grams of (N,N,N',N'-tetrakis(2-hydroxypropyl)ethylenediamine, 2.45 grams of ethylenediaminetetraacetic acid, 2.62 grams of a 37 weight percent aqueous formaldehyde solution, 3 grams of copper sulfate pentahydrate, and 0.06 gram of 2,2'-bipyridine. A 60 ml portion of this plating solution was dispensed into a 100-ml polypropylene beaker and the pH was adjusted to 12.3 with 4N aqueous NaOH. The electroless copper plating solution was then stirred for 15 minutes in a vessel placed within a mineral oil bath at 91° C.

Figure 7:
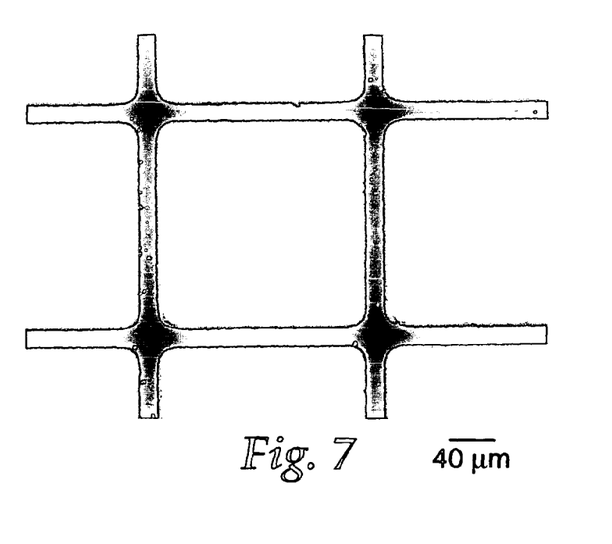
FIG. 7 is an optical photomicrograph of the replicated structure of FIG. 5 following selective deposition of copper.

As shown in FIG. 6, a scanning electron photomicrograph, and FIG. 7, an optical photomicrograph, copper was selectively deposited in the grid lines regions where the nanostructure existed. Other regions, such as the squares, where the surface was nominally smooth and did not possess the nanostructure, remained substantially free of copper deposit.

What is claimed is:
1. A method comprising:
A) providing a tool having a patterned-nanostructure surface having:
a) a nanostructured tool surface region that includes nanoscale topography formed by an electroplating process, and
b) an adjacent tool surface region that
(i) does not include nanoscale topography, and
(ii) is adjacent to the nanostructured tool surface region;
B) replicating the tool patterned-nanostructure surface onto a substrate to form a substrate patterned-nanostructure surface having:
a) a substrate nanostructured surface region, and
b) an adjacent substrate surface region that
(i) does not include nanoscale topography, and
(ii) is adjacent to the substrate nanostructured surface region;
C) disposing a metal layer on the substrate patterned-nanostructure surface to form a metallic patterned-nanostructure surface having:
a) a metallic nanostructured surface region, and
b) an adjacent metallic surface region that
(i) does not include nanoscale topography, and
(ii) is adjacent to the metallic nanostructured surface region;
D) forming a self-assembled monolayer on the metallic patterned-nanostructure surface, including:
a) the metallic nanostructured surface region, and
b) the adjacent metallic surface region that
(i) does not include nanoscale topography, and
(ii) is adjacent to the metallic nanostructured surface region;
E) after step D, without any intervening step, contacting the self-assembled monolayer on both the metallic nanostructured surface region and the adjacent metallic surface region to an electroless plating solution comprising a deposit metal; and
F) depositing electrolessly the deposit metal from the electroless plating solution selectively on the metallic nanostructured surface region having the self-assembled monolayer formed thereon contacting the electroless plating solution, and not on the adjacent metallic surface region having the self-assembled monolayer formed thereon contacting the electroless plating solution.

2. A method according to claim 1 wherein the replicating step comprises embossing a patterned-nanostructure surface, with the tool, onto a substrate surface, to form a substrate patterned-nanostructure surface.

3. A method according to claim 1 wherein the replicating step comprises molding the tool patterned-nanostructure surface onto a substrate surface to form a substrate patterned-nanostructure surface.

4. A method according to claim 1 wherein the forming step comprises forming a self-assembled monolayer on the metallic patterned-nanostructure surface, the metallic patterned-nanostructure surface comprising a metal selected from the group consisting of gold, silver, palladium, platinum, rhodium, copper, nickel, iron, indium, tin, and mixtures, alloys, and compounds thereof 5. A method according to claim 1 wherein the contacting step comprises contacting the self-assembled monolayer to an electroless plating solution comprising a deposit metal selected from the group consisting of copper, nickel, gold, silver, palladium, rhodium, ruthenium, tin, cobalt, and zinc as well as alloys of these metals with each other or with phosphorous or boron, as well as compounds of these metals with each other or with phosphorous or boron.

6. A method according to claim 1 wherein the forming step comprises forming a self-assembled monolayer on the metallic patterned-nanostructure surface, the substrate comprising a polymeric material and the metallic patterned-nanostructure surface is disposed on the substrate.

7. A method according to claim 1 wherein the forming step comprises forming a self-assembled monolayer on the metallic patterned-nanostructure surface, the substrate comprising a glass or semiconductor material and the metallic patterned-nanostructure surface is disposed on the substrate.

8. A method according to claim 1 wherein the forming step comprises forming a self-assembled monolayer on the metallic patterned-nanostructure surface, the self assembled monolayer comprising a chemical species selected from the group consisting of organosulfur compounds, silanes, phosphonic acids, benzotriazoles, and carboxylic acids.

9. A method according to claim 1 wherein the forming step comprises forming a self-assembled monolayer on the metallic patterned-nanostructure surface, the self assembled monolayer comprising an organosulfur compound selected from the group consisting of alkyl thiols, dialkyl disulfides, dialkyl thiocarbamates, and alkyl xanthates.

10. A method according to claim 1 wherein the providing step comprises providing a tool having a patterned-nanostructure surface, the patterned-nanostructure surface having a region comprising a nanostructured surface, the nanostructured surface comprising topographical features having an average size in a range from 10 to 500 nanometers.

11. A method according to claim 1 wherein the providing step comprises providing a tool having a patterned-nanostructure surface, the patterned-nanostructure surface having a region comprising a nanostructured surface, the region having a feature size in a range from 1 micrometer to 50 micrometer.

12. A method according to claim 1 wherein the substrate patterned-nanostructure surface further comprises microscale topographical features.

13. The method according to claim 1 further comprising selectively removing at least a portion of the metal layer from the substrate after electrolessly depositing the deposit metal selectively on the metallic nanostructured surface region having the self-assembled monolayer formed thereon, and not on the adjacent metallic surface region having the self-assembled monolayer formed thereon.

14. A method comprising:
A) providing a tool having a patterned-nanostructure surface having:
  a) a nanostructured tool surface region that includes nanoscale topography formed by an electroplating process, and
  b) an adjacent tool surface region that
    (i) does not include nanoscale topography, and
    (ii) is adjacent to the nanostructured tool surface region;
B) embossing a patterned-nanostructure surface, with the tool, onto a substrate metallic surface, to form a substrate metallic patterned-nanostructured surface having:
  a) a metallic nanostructured surface region, and
  b) an adjacent metallic surface region that
    (i) does not include nanoscale topography, and
    (ii) is adjacent to the substrate nanostructured surface region;
C) forming a self-assembled monolayer on the substrate metallic patterned-nanostructure surface, including
  a) the metallic nanostructured surface region, and
  b) the adjacent metallic surface region that
    (i) does not include nanoscale topography, and
    (ii) is adjacent to the metallic nanostructured surface region;
D) after step C, without any intervening step, contacting the self-assembled monolayer on both the metallic nanostructured surface region and the adjacent metallic surface region to an electroless plating solution comprising a deposit metal; and
E) depositing electrolessly the deposit metal from the electroless plating solution selectively on the metallic nanostructured surface region having the self-assembled monolayer formed thereon contacting the electroless plating solution, and not on the adjacent metallic surface region having the self-assembled monolayer formed thereon contacting the electroless plating solution.

* * * * *